United States Patent
Maloney et al.

(10) Patent No.: US 10,500,997 B2
(45) Date of Patent: Dec. 10, 2019

(54) TRANSLATABLE HEADREST

(71) Applicant: Ford Global Technologies, LLC, Dearborn, MI (US)

(72) Inventors: Patrick Maloney, Livonia, MI (US); Michael Steven Medoro, Livonia, MI (US); Chris Fredriksson, LaSalle (CA); Johnathan Andrew Line, Northville, MI (US); Christian J. Hosbach, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/955,057

(22) Filed: Apr. 17, 2018

(65) Prior Publication Data

US 2019/0315256 A1  Oct. 17, 2019

(51) Int. Cl.
    *B60N 2/829*  (2018.01)
    *B60N 2/865*  (2018.01)
(52) U.S. Cl.
    CPC ............ *B60N 2/829* (2018.02); *B60N 2/865* (2018.02)
(58) Field of Classification Search
    None
    See application file for complete search history.

(56) References Cited

U.S. PATENT DOCUMENTS

| | | | | |
|---|---|---|---|---|
| 6,616,236 B1* | 9/2003 | Su | ............................ | A47C 7/38 |
| | | | | 248/118 |
| 8,690,252 B2* | 4/2014 | Noguchi | ................. | B60N 2/002 |
| | | | | 297/391 |
| 2001/0028191 A1* | 10/2001 | Lance | ...................... | A47C 7/38 |
| | | | | 297/410 |
| 2007/0135982 A1* | 6/2007 | Breed | ...................... | B60J 10/00 |
| | | | | 701/36 |
| 2015/0375650 A1* | 12/2015 | Talamonti | ............... | B60N 2/874 |
| | | | | 297/409 |
| 2017/0120786 A1* | 5/2017 | Cao | .......................... | B60N 2/80 |

FOREIGN PATENT DOCUMENTS

| | | |
|---|---|---|
| DE | 4325996 A1 | 2/1995 |
| DE | 10146144 A1 | 4/2003 |
| DE | 202016101749 U1 | 3/2017 |
| EP | 0418516 A2 | 7/1990 |
| EP | 2698277 A1 | 2/2014 |

* cited by examiner

*Primary Examiner* — David E Allred
(74) *Attorney, Agent, or Firm* — Vichit Chea; Price Heneveld LLP

(57) ABSTRACT

A headrest includes a first assembly. The first assembly includes a first threaded shaft that is integrated with a first magnetized rotor of a first motor. Rotation of the first motor and the first threaded shaft results in vertical translation of a first threaded nut carrier such that a height of the headrest is adjusted.

12 Claims, 2 Drawing Sheets

TRANSLATABLE HEADREST

FIELD OF THE DISCLOSURE

The present disclosure generally relates to a headrest. More specifically, the present disclosure relates to a headrest for a seating assembly.

BACKGROUND OF THE INVENTION

Seating assemblies are often provided with headrests. Due to occupants of seating assemblies ranging in size and posture, a need exists for a headrest that can be adjusted to meet the variation in occupant size as well as comfort preferences.

SUMMARY OF THE INVENTION

According to a first aspect of the present disclosure, a headrest includes a first assembly. The first assembly includes a first threaded shaft that is integrated with a first magnetized rotor of a first motor. Rotation of the first motor and the first threaded shaft results in vertical translation of a first threaded nut carrier such that a height of the headrest is adjusted.

Embodiments of the first aspect of the present disclosure can include any one or a combination of the following features:
- the headrest further includes a second assembly that includes a second threaded shaft that is integrated with a second magnetized rotor of a second motor, wherein rotation of the second motor and the second threaded shaft results in horizontal translation of a second threaded nut carrier such that a horizontal position of the headrest is adjusted;
- the second assembly is coupled to the first threaded nut carrier;
- the second assembly is translated with the first threaded nut carrier as the first assembly adjusts the height of the headrest;
- the second threaded nut carrier is integrated with a bun assembly of the headrest;
- the first and second motors are brushless motors;
- the headrest is provided as a component of a seating assembly; and
- the seating assembly is installed in a vehicle.

According to a second aspect of the present disclosure, a headrest includes first and second assemblies. Each of the first and second assemblies includes a threaded shaft integrally formed with a magnetized rotor of a motor. Rotation of the motor and the threaded shaft results in translation of a threaded nut carrier. The first and second assemblies are configured to translate the headrest vertically and horizontally, respectively.

Embodiments of the second aspect of the present disclosure can include any one or a combination of the following features:
- the second assembly is coupled to the threaded nut carrier of the first assembly;
- the second assembly is translated with the first threaded nut carrier as the first assembly adjusts the height of the headrest;
- the second threaded nut carrier is integrated with a bun assembly of the headrest;
- the motors are brushless motors;
- headrest is provided as a component of a seating assembly; and
- the seating assembly is installed in a vehicle.

According to a third aspect of the present disclosure, a vehicle includes a seating assembly having a headrest. The headrest includes a first assembly equipped with a first threaded shaft that is integrated with a first magnetized rotor of a first motor. Rotation of the first motor and the first threaded shaft results in vertical translation of a first threaded nut carrier such that a height of the headrest is adjusted. The vehicle further includes a second assembly equipped with a second threaded shaft that is integrated with a second magnetized rotor of a second motor. Rotation of the second motor and the second threaded shaft results in horizontal translation of a second threaded nut carrier such that a horizontal position of the headrest is adjusted.

Embodiments of the third aspect of the present disclosure can include any one or a combination of the following features:
- the second assembly is coupled to the first threaded nut carrier;
- the second assembly is translated with the first threaded nut carrier as the first assembly adjusts the height of the headrest;
- the second threaded nut carrier is integrated with a bun assembly of the headrest; and
- the first and second motors are brushless motors.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
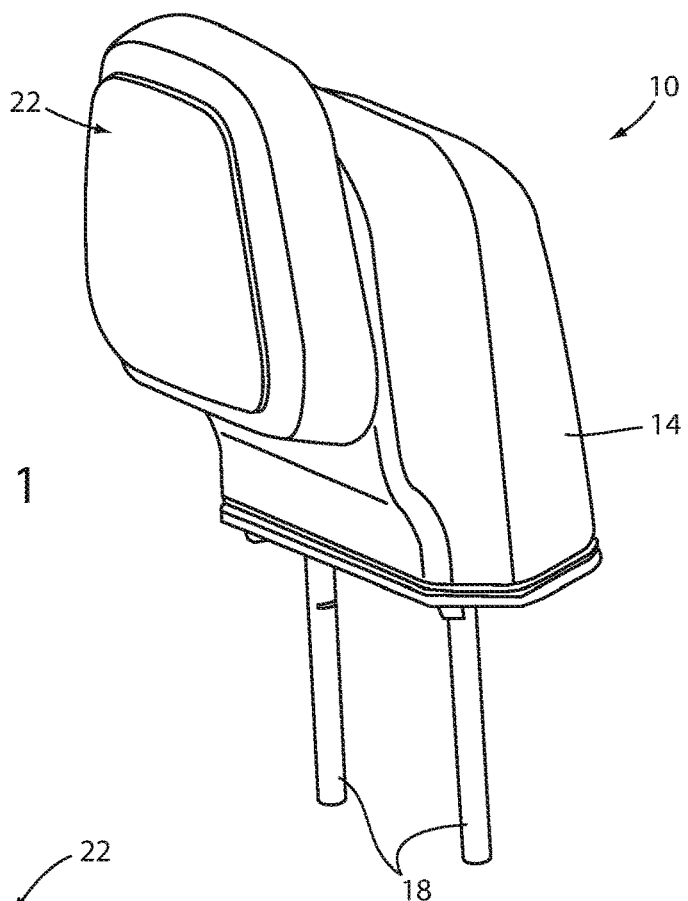
FIG. 1 is a side perspective view of a headrest, according to one embodiment of the present disclosure.
Figure 2:
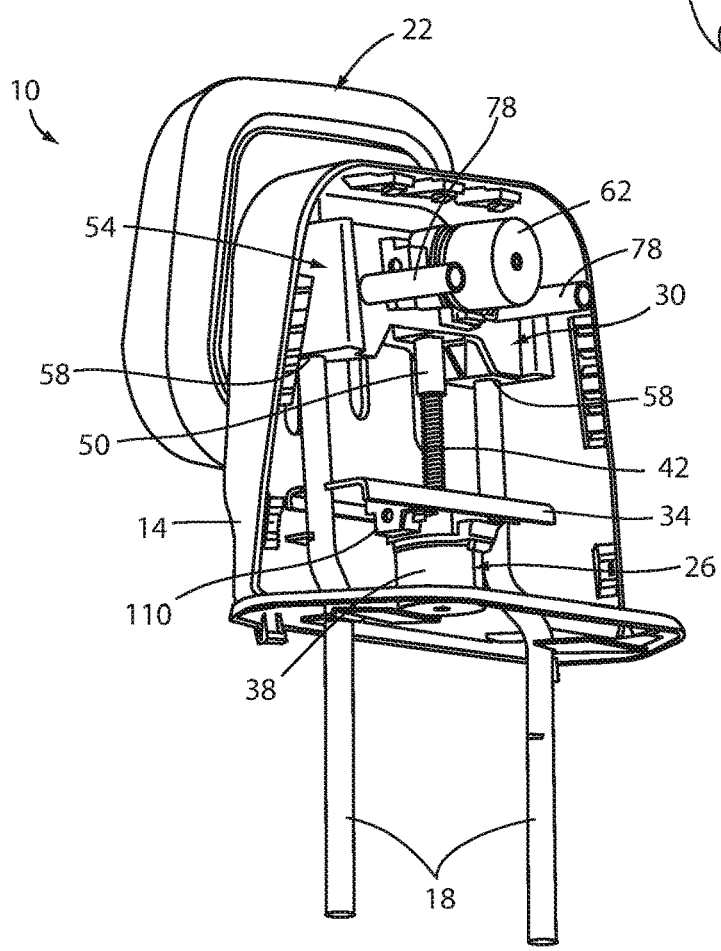
FIG. 2 is a rear perspective view of the headrest, illustrating the headrest in a retracted position.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a translatable headrest. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, a headrest 10 includes a main body 12. The main body 12 includes a housing 14 that encloses structural and/or moving components of the headrest 10. A pair of mounting posts 18 may extend in a downward direction from the housing 14. The mounting posts 18 may be utilized as a main support structure for the headrest 10 and may additionally be utilized to mount the headrest 10 to a seating assembly. For example, the mounting posts 18 may be fixedly or extendably coupled to a frame of a seatback of the seating assembly. The seating assembly may be a vehicle seating assembly that is installed within a vehicle. The mounting posts 18 are additionally utilized as mounting and/or support structures for the various components that are contained within the housing 14 and that will be discussed in further detail below. One such component is a bun assembly 22 of the headrest 10. The bun assembly 22 of the headrest 10 is the component or assembly with which a head of an occupant directly interacts. The bun assembly 22 includes a comfort pad 24.

Referring again to FIGS. 2 and 3, the headrest 10 is shown with a rearward portion of the housing 14 removed. Within the housing 14, a first assembly 26 and a second assembly 30 are coupled to the mounting posts 18. The first assembly 26 is coupled to the mounting posts 18 by a mounting bracket 34 that is fixedly positioned relative to the mounting posts 18. A first motor 38 is coupled to an underside of the mounting bracket 34. A first threaded shaft 42 of the first assembly 26 extends out of the first motor 38 and passes through an aperture 46 in the mounting bracket 34. The first threaded shaft 42 is integrated with a first magnetized rotor 48 (FIG. 4) of the first motor 38 such that rotation of the first motor 38 induces rotation of the first threaded shaft 42. Said another way, the first threaded shaft 42 is integrally formed with the first magnetized rotor 48 of the first motor 38. Rotation of the first motor 38 and the first threaded shaft 42 results in vertical translation of a first threaded nut carrier 50 such that a height of the headrest 10 is adjusted.

Figure 3:
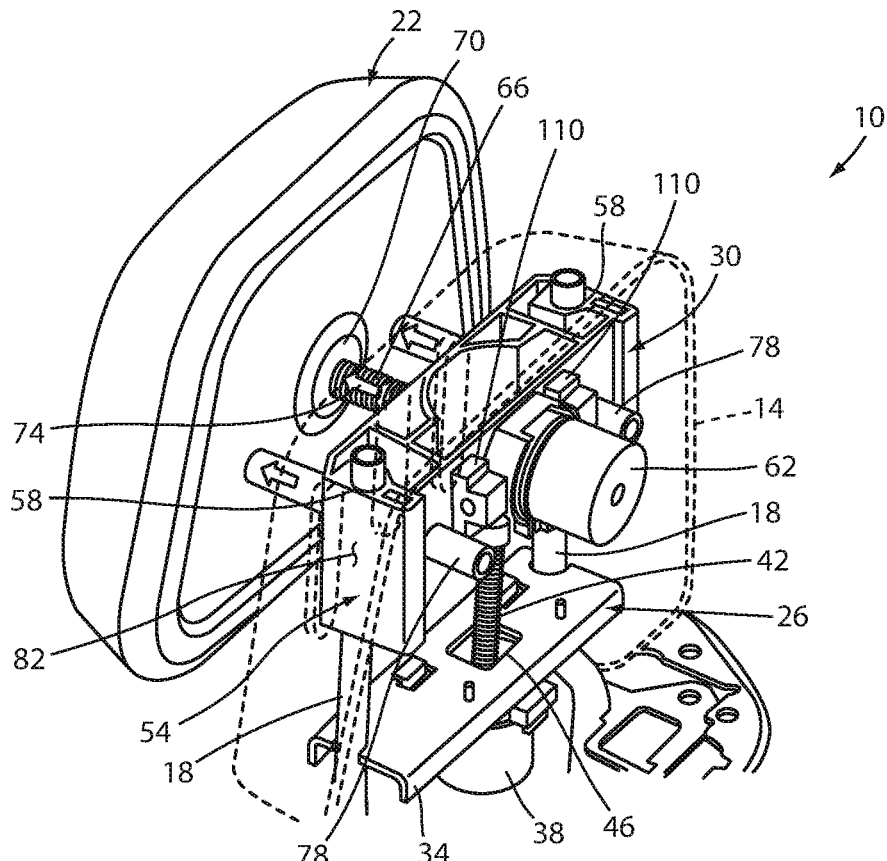
FIG. 3 is a top perspective view of the headrest, illustrating the headrest in an extended position.

Referring further to FIGS. 2 and 3, the first threaded nut carrier 50 may be coupled to, or integrally formed with, the second assembly 30. Accordingly, the second assembly 30 is translated with the first threaded nut carrier 50 as the first assembly 26 adjusts the height of the headrest 10. The second assembly 30 is slidably coupled with the mounting posts 18 by a guide bracket 54. The guide bracket 54 engages with the mounting posts 18 by way of guide apertures 58 positioned on either side of the guide bracket 54 and spaced to correspond with the mounting brackets 18. The guide bracket 54 of the second assembly 30 carries or houses a second motor 62. The second motor 62 includes a second threaded shaft 66 that is integrated with a second magnetized rotor such that rotation of the second motor 62 induces rotation of the second threaded shaft 66. Said another way, the second threaded shaft 66 is integrally formed with the second magnetized rotor of the second motor 62. The second threaded shaft 66 passes through the guide bracket 54 and engages with a second threaded nut carrier 70. The second threaded nut carrier 70 may be integrated with the bun assembly 22 of the headrest 10. Accordingly, rotation of the second motor 62 and the second threaded shaft 66 results in horizontal translation of the second threaded nut carrier 70, and ultimately the bun assembly 22, such that a horizontal position of the headrest 10 is adjusted as indicated by arrow 74. The bun assembly 22 of the headrest 10 may additionally be coupled to the second assembly 30 by one or more guide rods 78 that extends through the housing 14 to engage with both the bun assembly 22 and the second assembly 30. The guide rods 78 may be fixedly coupled to a rearward surface of the bun assembly 22 and slidably engage with the guide bracket 54. The guide rods 78 travel within guide channels 80 that are positioned in the housing 14 when the bun assembly 22 is actuated in the vertical direction. Accordingly, the bun assembly 22 is configured to move in horizontal and vertical directions with respect to the main body 12, while the main body 12 remains stationary. It may be beneficial to utilize more than one of the guide rod 78 in an effort to prevent unintentional non-linear motion of the bun assembly 22.

Referring still further to FIGS. 2 and 3, the guide rods 78 are positioned radially inward of the mounting posts 18. By positioning the guide rods 78 radially inward of the mounting posts 18, the extent of vertical and horizontal translation of the headrest 10 can be increased. The extent of vertical and horizontal translation is limited, at least partially, by the space available within the housing 14. By configuring the guide rods 78 and the mounting posts 18 to occupy different axial or radially positions in a horizontal plane, physical interference between the guide rods 78 and the mounting posts 18 is prevented. When the guide rods 78 and the mounting posts 18 occupy axial or radial positions in the horizontal plane that are within close proximity to one another or overlapping, then the extent of vertical and horizontal translation of the headrest 10 is limited due to physical interference. The entirety of the second assembly 30, with the exception of an exterior surface 82 of the guide bracket 54, is contained within the confines defined by the mounting posts 18. Accordingly, the overall size of the headrest 10 can be maintained as a relatively compact assembly while maintaining sufficient spacing of the guide rods 78 to prevent binding of the second assembly 30 as the bun assembly 22 of the headrest 10 is actuated in the horizontal direction.

Referring yet again to FIGS. 2 and 3, in one example the first threaded shaft 42 and the second threaded shaft 66 may be similarly offset from one another to prevent physical interferences with one another. As with the configuration discussed with regard to the guide rods 78 and the mounting posts 18, by offsetting the axial or radial position of the first and second threaded shafts 42, 66 in the horizontal plane it is possible to achieve a greater degree of translation in both the horizontal and the vertical direction. In an alternative example, the first threaded shaft 42 may be positioned at the same axial or radial position in the horizontal plane. Said another way, the first threaded shaft 42 may be positioned directly below the second threaded shaft 66 such that, with a sufficient amount of actuation, the first threaded shaft 42 may come into physical contact with the second motor 62 or components thereof (e.g., the second threaded shaft 66). While such an arrangement may limit at least the degree with which the bun assembly 22 may be actuated in the vertical direction, arranging the first and second threaded shafts 42, 66 in such a manner may be beneficial. For example, by aligning the first and second threaded shafts 42, 66 a configuration is possible where the first and second threaded shafts 42, 66 are each positioned in a central location within the housing 14 of the headrest 10. With the first and second threaded shafts 42, 66 centrally positioned, it is possible to avoid a torque force on the components of the headrest 10 that may otherwise exist in arrangements where the first and second threaded shafts 42, 66 are offset from one another.

Figure 4:
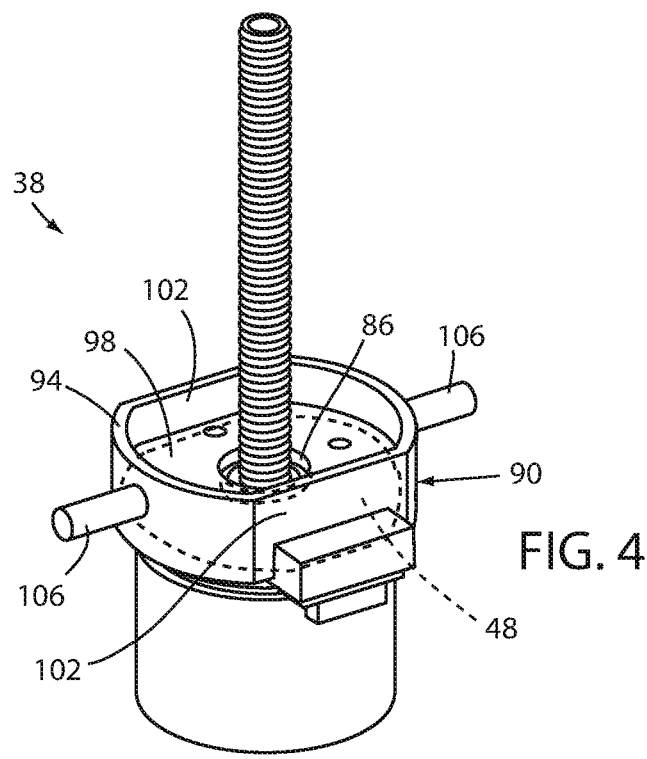
FIG. 4 is a side perspective view of a motor for the headrest, according to one embodiment.

Referring now to FIG. 4, the first motor 38 is shown according to one embodiment. The first motor 38 includes the first magnetized rotor 48 that is equipped with a plurality of magnets directly coupled to an interior wall of the first magnetized rotor 48 and evenly distributed about an interior circumference of the first magnetized rotor 48. The first threaded shaft 42 is directly coupled to the first magnetized rotor 48 in an integral fashion. For example, the first threaded shaft 42 may be welded to an exterior surface of the first magnetized rotor 48. Alternatively, the first threaded shaft 42 may be integrally formed with the first magnetized rotor 48 at the time the first magnetized rotor 48 is manufactured such that a seam or fastening bead is not present at the junction between the first threaded shaft 42 and the first magnetized rotor 48. The first threaded shaft 42 passes through a motor-mount aperture 86 in a motor mount 90 of the first motor 38. The motor mount 90 is equipped with an exterior wall 94 that extends above a recessed surface 98 of the motor mount 90. The exterior wall 94 of the motor mount 90 may be generally circular or oblong in shape. The exterior wall 94 may be provided with one or more flat faces 102. The flat faces 102 may be utilized as alignment surfaces for coupling the first motor 38 to the remaining components of the first assembly 26. Alternatively or additionally, the flat faces 102 may be utilized as bearing surfaces that prevent rotation of the motor mount 90 within the first assembly 26 as the first motor 38 applies a torque to the first magnetized rotor 48 and the first threaded shaft 42. The exterior wall 94 may additionally or alternatively utilize one or more motor-mount pins 106 to mount the first motor 38 to the first assembly 26 and at least partially prevent rotation of the motor mount 90 within the first assembly 26 as the first motor 38 applies a torque to the first magnetized rotor 48 and the first threaded shaft 42. For example, the motor-mount pins 106 may engage with pin receivers 110 (FIGS. 2 and 3) on the first assembly 6. It is contemplated that in some examples one of the flat faces 102 and one of the motor-mount pins 106 may be utilized to mount the first motor 38 to the first assembly 26, align the first motor 38 within the first assembly 26, and prevent rotation of the motor mount 90 within the first assembly 26 rather than utilizing a plurality of the flat faces 102 and/or a plurality of the motor-mount pins 106. While the preceding description of FIG. 4 is referenced with regard to the first motor 38, it is contemplated that the description may also apply to the second motor 62 with necessary adjustments in element names and reference numerals. In various examples, the first motor 38 and/or the second motor 62 may be direct-current (DC) motors. In further examples, the first motor 38 and/or the second motor 62 may be brushless direct-current (DC) motors. Brushless DC motors may be beneficial for use in the present disclosure in an effort to decrease noise output by the first and second motors 38, 62. Decreasing noise output of the first and second motors 38, 62 is beneficial due to the proximity of the first and second motors 38, 62 to a user's head and ears.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A headrest, comprising:
   a main body comprising a housing;
   at least one headrest post for supporting the headrest on a backrest;
   a first assembly comprising a mounting bracket and a first threaded shaft that is integrated with a first magnetized rotor of a first motor, wherein the mounting bracket is fixedly mounted on the at least one headrest post and the first motor is mounted on the mounting bracket, wherein rotation of the first motor and the first threaded shaft results in vertical translation of a first threaded nut carrier such that a height of the headrest is adjusted; and
   a second assembly comprising a guide bracket and a second threaded shaft that is integrated with a second magnetized rotor of a second motor, wherein the guide bracket is slidably supported on the at least one headrest post and the second motor is mounted on the guide bracket, wherein rotation of the second motor and the second threaded shaft results in horizontal translation of a second threaded nut carrier such that a horizontal position of the headrest is adjusted, and wherein the first and second assemblies are completely contained in the housing.

2. The headrest of claim 1, wherein the second assembly is coupled to the first threaded nut carrier.

3. The headrest of claim 2, wherein the second assembly is translated with the first threaded nut carrier as the first assembly adjusts the height of the headrest.

4. The headrest of claim 1, wherein the second threaded nut carrier is integrated with a bun assembly of the headrest.

5. The headrest of claim 1, wherein the first and second motors are brushless motors.

6. The headrest of claim 1, wherein the headrest is provided as a component of a seating assembly.

7. The headrest of claim 6, wherein the seating assembly is installed in a vehicle.

8. A vehicle, comprising:
   a seating assembly having a headrest, wherein the headrest comprises:
   a main body comprising a housing;
   at least one headrest post for supporting the headrest on a backrest;
      a first assembly comprising a mounting bracket and a first threaded shaft that is integrated with a first magnetized rotor of a first motor, wherein the mounting bracket is fixedly mounted on the at least one headrest post and the first motor is mounted on the mounting bracket, wherein rotation of the first motor and the first threaded shaft results in vertical translation of a first threaded nut carrier such that a height of the headrest is adjusted; and
      a second assembly comprising a guide bracket and a second threaded shaft that is integrated with a second magnetized rotor of a second motor, wherein the guide bracket is slidably supported on the at least one headrest post and the second motor is mounted on the guide bracket, wherein rotation of the second motor and the second threaded shaft results in horizontal translation of a second threaded nut carrier such that a horizontal position of the headrest is adjusted, and wherein the first and second assemblies are completely contained in the housing.

9. The headrest of claim 8, wherein the second assembly is coupled to the first threaded nut carrier.

10. The headrest of claim 9, wherein the second assembly is translated with the first threaded nut carrier as the first assembly adjusts the height of the headrest.

11. The headrest of claim 8, wherein the second threaded nut carrier is integrated with a bun assembly of the headrest.

12. The headrest of claim 8, wherein the first second motors are brushless motors.

* * * * *

UNITED STATES PATENT AND TRADEMARK OFFICE
CERTIFICATE OF CORRECTION

PATENT NO.       : 10,500,997 B2
APPLICATION NO.  : 15/955057
DATED            : December 10, 2019
INVENTOR(S)      : Maloney et al.

Page 1 of 1

It is certified that error appears in the above-identified patent and that said Letters Patent is hereby corrected as shown below:

In the Claims

Column 8;
Claim 1, Line 7:
After "adjusted," delete "and".
Claim 1, Line 8:
After "first" insert --assembly is--.
Delete "and second assemblies are".
"in" should be --within--.
Claim 1, Line 9:
After "housing" insert --, and wherein the second assembly is substantially contained within the housing--.
Claim 8, Line 47:
After "adjusted," delete "and".
Claim 8, Line 47:
After "first" insert --assembly is--.
Claim 8, Lines 47-48:
Delete "and second assemblies are".
Claim 8, Line 48:
"in" should be --within--.
Claim 8, Line 48:
After "housing" insert --, and wherein the second assembly is substantially contained within the housing.--.
Claim 12, Line 56:
After "first" insert --and--.

Signed and Sealed this
Eighteenth Day of February, 2020

Andrei Iancu
*Director of the United States Patent and Trademark Office*